(12) United States Patent
Durfee et al.

(10) Patent No.: US 6,898,579 B1
(45) Date of Patent: May 24, 2005

(54) SYSTEM, METHOD AND ARTICLE OF MANUFACTURE FOR CONTRACT TERM CERTIFICATION UTILIZING A NETWORK

(75) Inventors: Glenn Durfee, San Francisco, CA (US); Matthew K. Franklin, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/544,708

(22) Filed: Apr. 6, 2000

(51) Int. Cl.[7] ............................ G06F 17/60; H04K 1/00; H04L 9/00
(52) U.S. Cl. ............................ 705/80; 705/50; 705/51; 705/54; 715/511; 715/514
(58) Field of Search .............................. 705/50, 35, 51, 705/80; 707/512; 715/511, 514

(56) References Cited

U.S. PATENT DOCUMENTS

| | | | | |
|---|---|---|---|---|
| 5,191,613 A | * | 3/1993 | Graziano et al. | 340/5.86 |
| 5,590,269 A | * | 12/1996 | Kruse et al. | 345/700 |
| 5,615,268 A | * | 3/1997 | Bisbee et al. | 380/30 |
| 5,850,219 A | * | 12/1998 | Kumomura | 345/751 |
| 5,890,177 A | * | 3/1999 | Moody et al. | 707/511 |
| 5,892,900 A | * | 4/1999 | Ginter et al. | 713/200 |
| 5,953,702 A | * | 9/1999 | Ohlemacher et al. | 705/1 |
| 6,021,202 A | * | 2/2000 | Anderson et al. | 705/18 |
| 6,067,531 A | * | 5/2000 | Hoyt et al. | 705/35 |
| 6,101,254 A | * | 8/2000 | Thiriet | 380/2 |
| 6,338,050 B1 | * | 1/2002 | Conklin et al. | 705/26 |
| 6,343,283 B1 | * | 1/2002 | Saito et al. | 380/201 |

FOREIGN PATENT DOCUMENTS

WO    WO 9947990 A1 * 9/1999 ............. G06F/1/00

OTHER PUBLICATIONS

Cramer, Ronald and Damgard, Ivan "Zero–Knowledge Proofs for Finite Field Arithmetic, or: Can Zero–Knowledge Be for Free?" Proceedings of Advances in Cryptology CRYPTO '98, Lecture Notes in Computer Science, Springer–Verlag, 1998, vol. 1462, pp. 424–441.

Fiat, Amos and Shamir, Adi "How to Prove Yourself: Practical Solutions to Identification and Signature Problems" Proceedings Advances in Cryptlogy–CRYPTO '86, Lecture Notes in Computer Science, Springer–Verlag, 1986, vol. 263, pp. 186–194.

Stefik, Mark and Silverman, Alex "The Bit and the Pendulum: Balancing the Interests of Stakeholders in Digital Publishing," The Computer Lawyer, 1999, vol. 16, pp. 1–15.

* cited by examiner

*Primary Examiner*—John W. Hayes
*Assistant Examiner*—Kambiz Abdi (57) ABSTRACT

A system, method and article of manufacture are provided for certifying contracts utilizing a network. Initially, a first and second contract is received utilizing a network. Each contract includes a plurality of terms. It is then certified that the terms of the second contract are consistent with the terms of the first contract.

28 Claims, 6 Drawing Sheets

SYSTEM, METHOD AND ARTICLE OF MANUFACTURE FOR CONTRACT TERM CERTIFICATION UTILIZING A NETWORK

FIELD OF THE INVENTION

The present invention relates generally to cryptography and, more particularly, to digital transactions over a network involving contracts.

BACKGROUND OF THE INVENTION

In recent years, a number of digital contract systems have been proposed to encourage the production, distribution, and sale of high-quality digital works over networks, such as the Internet. These systems allow rights, fees, and other terms and conditions to be associated with a given work. Combined with proposed secure software and hardware, digital contracts can be enforced to insure proper payment and rights management for digital works. Of course, there are many potential vulnerabilities at the software and hardware levels that an attacker could exploit to subvert a digital contract system. In particular, security problems can arise even when the system is assumed to protect content and enforce contracts as specified.

Systems to enforce digital contracts are already in place or may be available soon. For instance, examples of such systems are set forth by M. Stefik and A. Silverman, "The Bit And the Pendulum: Balancing the Interests of Stakeholders in Digital Publishing", The Computer Lawyer, Vol. 16, pp. 1–15, 1999; ContentGuard: Rights Protection from Xerox, http://www. contentguard.com/; Intertrust Digital Rights Management, http: //www. intertrust.com/; and The Secure Digital Music Initiative, http: //www. sdmi. org/ which are each incorporated herein by reference in their entirety.

In operation, these kinds of systems are capable of being used to support relatively simple business models. Such business models do not involve middlemen, who buy digital content from one or more providers, repackage or otherwise add value, and then resell to consumers or to other middlemen. It is expected that in the near future middlemen may be prevalent in the digital work business. Every middleman in a distribution chain produces a new contract to enforce a new set of terms and conditions. For long distribution chains, it may be unwieldy to carry along every contract that was created along the way. This would be undesirable from a practical business perspective as well. The seller has a strong incentive to conceal from the buyer earlier contracts along a chain. If a potential buyer gets to see earlier contracts, the buyer might be tempted to renegotiate the new contract at more favorable terms, or "disintermediate" the seller and negotiate independently with earlier sellers in the chain. There is a natural privacy requirement here that may be crucial for creating viable business niches.

There is a natural integrity requirement that is also fundamental. A middleman may wish to keep secret the favorable terms of earlier contracts in a distribution chain, but he may not be allowed to negotiate a new contract that violates his existing obligations. As a result of adding value to a digital work, a reseller is certainly entitled to be compensated by raising the fees associated with use of the content. Other terms associated with the earlier contract might be altered by a reseller as well. Expiration dates might be moved up, or hardware security requirements might be tightened, or payment options might shift (e.g., from flat rates to per-use fees). Any changes that are made in the new contract may in some sense be "faithful" to, or in other words, consistent with the original contract —existing payment obligations may not decrease, expiration dates may not move into the future, new rights cannot be granted, and so on.

These two requirements are in conflict with each other. Verifying that a new contract is faithful to an old contract seems to require that both contracts be inspected by the new buyer, but that would violate the privacy needs of the seller. There is thus a need for a cryptographic approach to balance distribution chain privacy and distribution chain integrity.

A system, method and article of manufacture are provided for certifying contracts utilizing a network. Initially, a first and second contract is received utilizing a network. Each contract includes a plurality of terms. It is then certified that the terms of the second contract are consistent with the terms of the first contract. This provides distribution chain integrity in accordance with one of the objectives of the present invention.

In one embodiment of the present invention, received with the contacts is proof that the terms of the second contract are consistent with, or "faithful" to the terms of the first contract. As such, the certification may be based on the proof. As an option, the proof may be generated by comparing the terms of the first and second contract.

In one embodiment of the present invention, received with the contracts is proof that the terms of the second contract are consistent with, or "faithful" to the terms of the first contract. As such, the certification may be based on the proof. As an option, the proof may be generated by comparing the terms of the first and second contract.

In yet another embodiment of the present invention, the first contract may be received with a certifier indicating that the terms of the first contract are consistent with terms of a previous contract. Optionally, at least a portion of the terms of at least one of the contracts is obfuscated, and the second contract may be sent with obfuscated terms utilizing the network. This provides distribution chain privacy in accordance with one of the objectives of the present invention.

In one aspect of the present invention, a system, method and article of manufacture may be provided for obfuscating terms of a document in order to provide distribution chain privacy. In operation, a document, i.e. contract, may be received including a plurality of terms. Once received, at least one of the terms of such document may be identified. As such, the identified term of the document may be obfuscated. This feature may be particularly beneficial when giving a party the document when one wants to retain some of the tenms thereof as confidential.

In one embodiment of the instant aspect, the contract may be received from a first party, and further sent to a second party with the at least one obfuscated term utilizing a network. As an option, the at least one term of the contract may be identified based on a list of terms.

In this way, the present invention demonstrates an extremely efficient solution to the problem of distribution chain security, and thus extend the realm of real-world settings for which zero-knowledge proof techniques are practical. These and other advantages of the present invention may become apparent upon reading the following detailed description and studying the various figures of the drawings.

BRIEF DESCRIPTION OF THE DRAWINGS

The foregoing and other objects, aspects and advantages are better understood from the following detailed description of a preferred embodiment of the invention with reference to the drawings, in which.

DESCRIPTION OF THE PREFERRED EMBODIMENTS

If resale and distribution of digital works is to be feasible, safeguards should be provided to ensure that existing obligations to rights holders of resold works are maintained. In the present description, various terms relating to this "faithfulness," or consistency, requirement will be set forth for an exemplary property rights language. The approach taken here applies to a large class of rights languages. The following terms embody concepts common to many property rights languages, and are used throughout this document.

Right —A right specified by a contract is a term or sequence of keywords in a contract, the presence of which in the contract allows a holder of the work to use it in a specified manner. For example, the right to print or to sell a copy of the work may be granted to a user. Furthermore, a right may have conditions, fees, and terms associated with it which may be satisfied in order to exercise the specified activity.

For example, the right to print the content may be associated with the requirement to pay a certain sum of money, along with the requirement that the work may be printed only using a trusted printer capable of embedding watermarks. Examples of rights include, but are not limited to printing, rendering, playing, copying, selling, and loaning the work, as well as including excerpts of the content in other works and embedding the content into other works. Specifications and terms may include, but are not limited to fee specifications, time specifications (such as release and expiration dates), hardware security requirements, and watermarking requirements.

Contract: A contract is a specification written in a property rights language, such as the Digital Property Rights Language, and specifies the rights granted to the holder of the digital work and the terms associated with exercising those permissions. In one embodiment, it is a sequence of string tokens conforming to the rights language syntax, stored as a file and linked to the corresponding work in a way that forbids modification by users. A number of well known methods may be used to accomplish this, including use of secure hardware or software, cryptographic techniques, or secure contract servers.

Author: The author of a digital work is the original creator and can specify (possibly in conjunction with a publisher) the initial contract to be associated with a work.

Reseller: A reseller, such as a publisher, distributor or other middleman is an entity intermediate in the chain of distribution. A reseller makes a work available after modifying it, bundling it with other content, or performing some other service with respect to the work or its distribution. In doing so the reseller typically replaces the contract associated with the work.

A preferred embodiment of a system in accordance with the present invention is preferably practiced in the context of a personal computer such as an IBM ¢compatible personal computer, Apple Macintosh computer or UNLX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112.

Figure 1:
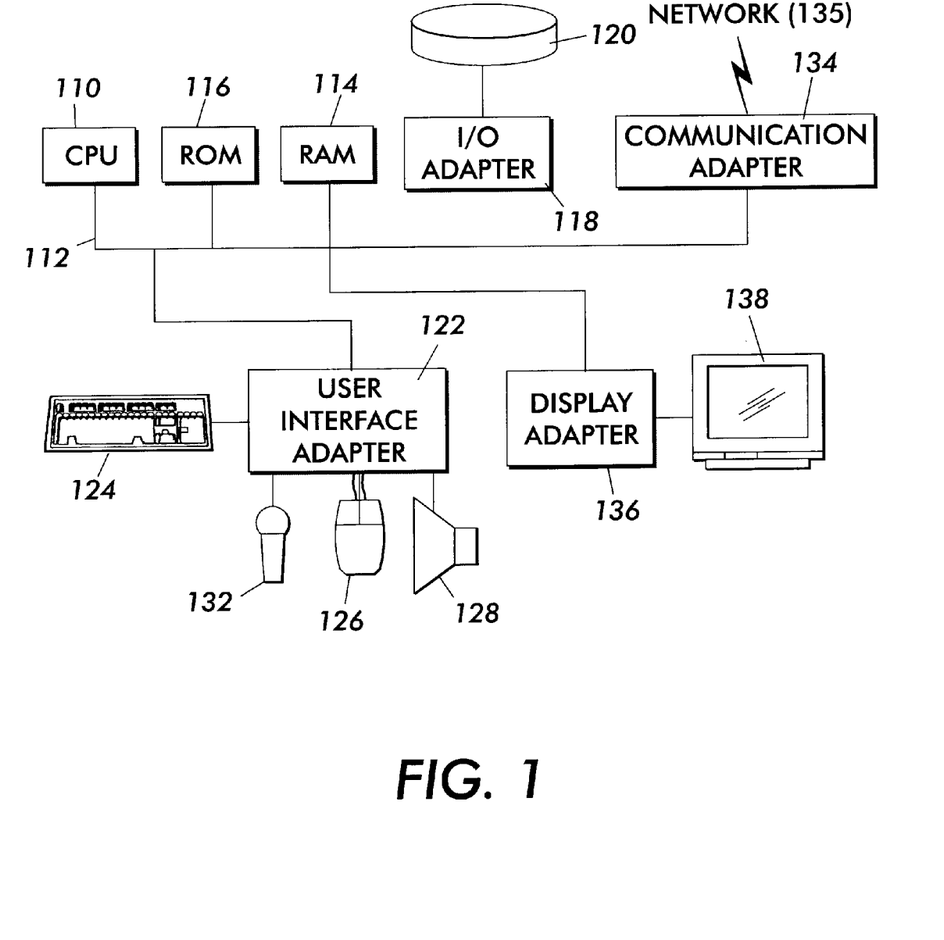
FIG. 1 illustrates a representative hardware environment in accordance with one embodiment of the present invention.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned. A preferred embodiment is written using JAVA, C, and the C++ language and utilizes object oriented programming methodology.

Figure 2:
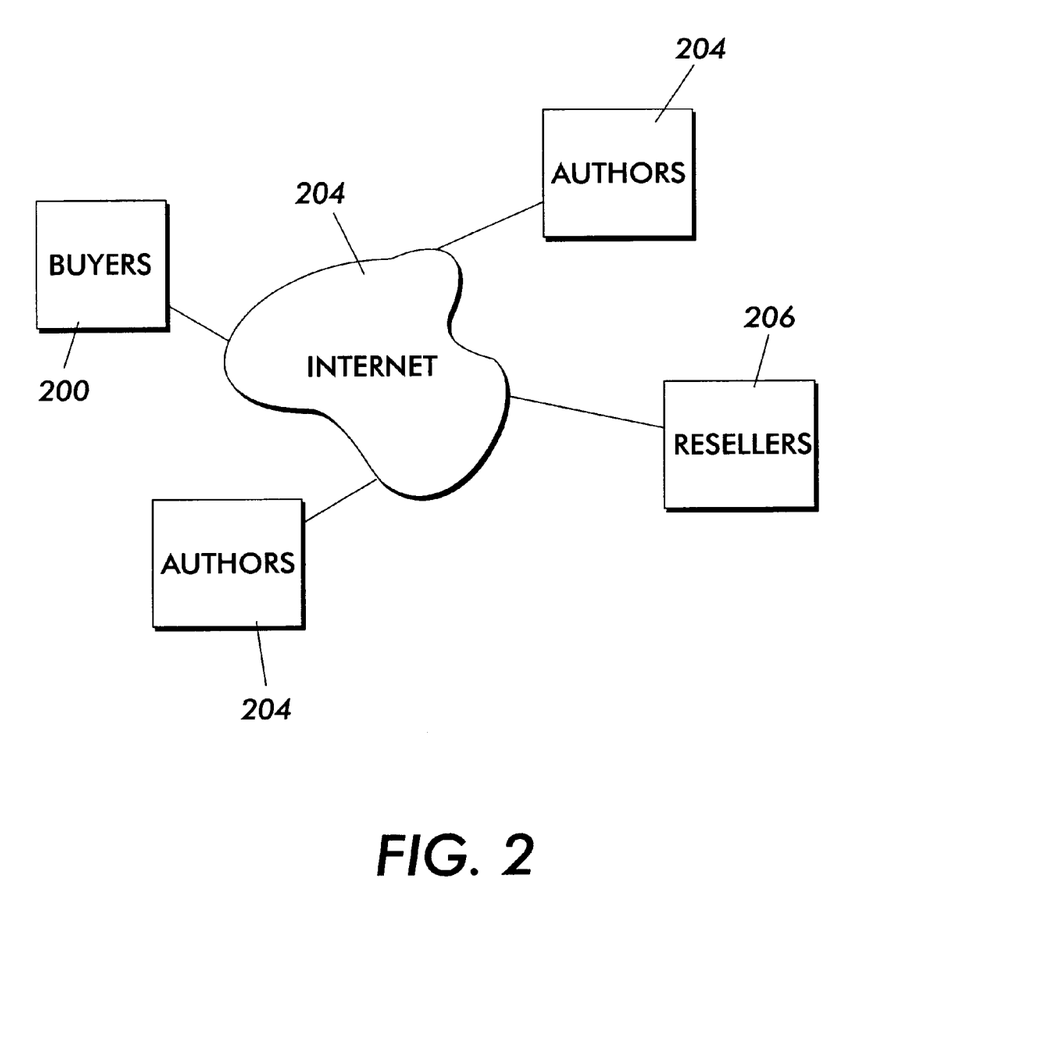
FIG. 2 is a schematic diagram illustrating a network of computers similar that shown in FIG. 1.

FIG. 2 is a schematic diagram illustrating a network of computers similar that shown in FIG. 1, wherein a plurality of buyers 200, authors 204, and resellers 206 interact in the context of the present invention over a network 208 such as the Internet. In a typical scenario, the authors 204 generate works which are sold to resellers 206 who in turn add value, and resell to the buyers 200. As mentioned earlier, there is a need for a cryptographic approach to balance distribution chain privacy and distribution chain integrity.

Ensuring Integrity

When a reseller wishes to change the rights or obligations associated with a work, it may be confirmed that these changes do not violate, or are consistent with the terms of the original contract. For example, legal obligations to pay existing royalties cannot be erased, and these amounts cannot be decreased, although perhaps the form of payment can be altered. When contract $C_{new}$ honors the terms of contract $C_{old}$, the present invention assumes that $C_{new}$ is faithful to $C_{old}$, and this is denoted as $C_{new} \leq C_{old}$.

Each rights language L gives rise to a particular set of contracts and a particular faithfulness relation. For most contract languages, the predicate $C_{old} \leq C_{new}$ can be expressed using arithmetic expressions between the terms of $C_{old}$ and $C_{new}$.

A general condition that may hold is that if the new contract $C_{new}$, grants a right R to a buyer or user of the work, then that right R must be granted in the original contract $C_{old}$. Furthermore, except for a number of predetermined terms, most terms associated with R in $C_{new}$ may match those in $C_{old}$ exactly. Examples of such exceptions will now be set forth.

If contract $C_{old}$ specifies that a right R expires on a date D, then the contract $C_{new}$ may specify that the right R expires on a date D', where D'<D (D' is at least as soon as D). Similarly, if D and D' encode release dates (earliest possible date in which the right can be invoked), then it is required that D'>D.

In the simplest case, if contract $C_{old}$ specifies that exercising a right R includes an obligation to pay party P an amount A, then the contract $C_{new}$ may include an obligation to pay party P an amount A', where A'≧A, for exercising the same right R. Examples exist in which payment amounts are converted to and from metered rates, per-use fees, and flat fees, and between currencies.

In one embodiment of the present invention, a financial model is used in which a user pays the single fee A' to the single entity P (such as a financial clearinghouse) when a right is executed. Then P is responsible for dividing A' among deserving parties, resulting in the simple condition that A≦A'. Alternatives to this scenario are possible and result in different predicates. Additional information on such alternatives will be discussed later in further detail.

If contract $C_{old}$ specifies that exercising a right R requires trusted hardware of a security level L, then contract $C_{new}$ may specify that exercising right R requires trusted hardware of security level L' satisfying L'≧L.

Distribution Chain Privacy

A protocol will now be outlined that allows the details about old and new contracts to be kept secret, while still enabling a proof of the integrity of the system to be provided. The present invention is adapted for creating and verifying zero-knowledge proofs of predicates in a commitment scheme. This is accomplished by exploiting the fact that predicates of interest, that is, predicates expressing a faithfulness relation between contracts can be efficiently represented using existing zero-knowledge techniques.

During the remaining description regarding distribution chain privacy, various terms are employed which are defined below.

Commitment: A commitment can be thought of as a "sealed envelope" which cannot be opened without knowing the value inside the envelope. If c=commit (v) then it may be difficult or impossible to compute v directly from c. This is referred to as the hiding property of the commitment scheme. If v is revealed, however, it may be easy to verify that c=commit (v). Furthermore, it may be difficult or impossible to create a commitment for which two different values could be successfully revealed. This may be referred to as the binding property of the scheme. The commitment schemes described satisfy all of these conditions under suitable intractability assumptions.

Zero-Knowledge Proof: A zero-knowledge proof Z of a predicate P on values $v_1, \ldots v_n$, is a message from a prover (usually a reseller) to a verifier (which for purposes of the present description will be the contract certification authority, although it could also be a user, publisher, author, another reseller, or any other party) intended to convey the validity of the predicate P without revealing the values $v_i$. In one embodiment, the present invention may be focused on zero-knowledge proofs that have been made non-interactive using the Fiat-Shamir heuristic.

In practice, a verifier of the proof receives commit($v_i$), . . . , commit($v_n$) along with the proof Z. The verifier performs a computation to determine if the proof is valid, and may accept the proof (thus believing that P holds) with only an exponentially small probability of error if P in fact holds. The verifier may learn no information about the values $V_i$ except that they satisfy the predicate P.

Of course, if the predicate P does not hold on the values $V_i$ then there may be at most an exponentially small probability that the prover can create a proof that verifies correctly. Furthermore, in one embodiment, a proof for particular values $V_i$ may not be manipulated in a way to allow it to verify for any other values $v_i \neq v_i$.

Obfuscated Contract: An obfuscated contract is a contract in which some of the values have been replaced by commitments to those values. If C is a contract with values $v_1, \ldots, v_n$ that one wishes to obfuscate, obfuscated contract obs (C) may be produced by replacing each value $v_i$ with the commitment commit($v_i$). The obfuscation of contracts can be thought of as a commitment scheme for contracts.

In practice, only the handful of values corresponding to sensitive numeric or string fields may be replaced with commitments. Therefore, an obfuscated contract differs only very slightly in length and structure from its unobfuscated counterpart.

Figure 3:
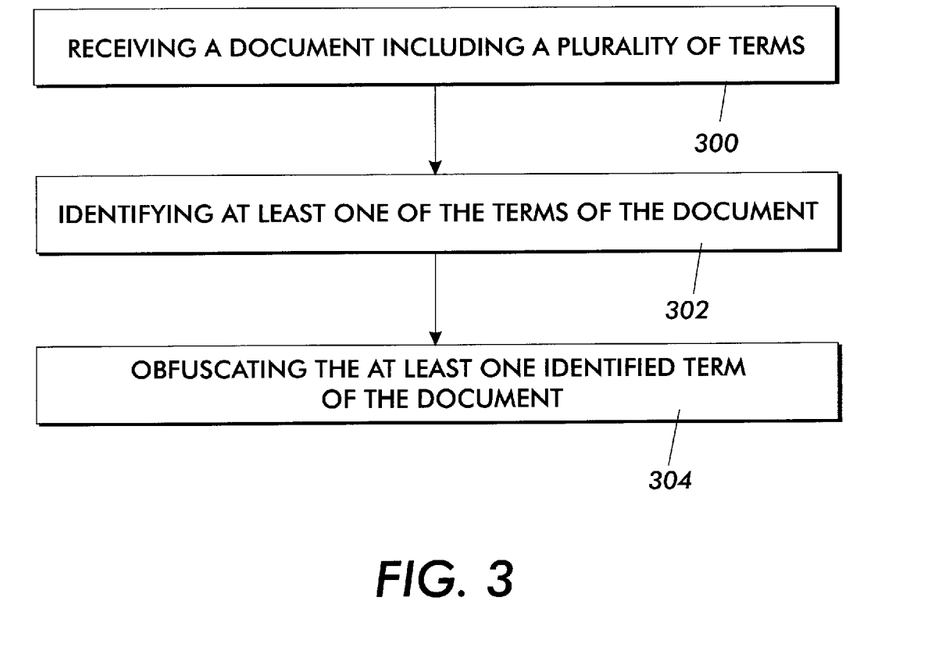
FIG. 3 illustrates a method for obfuscating terms of a document in accordance with one embodiment of the present invention.

FIG. 3 illustrates a method for obfuscating terms of a document in accordance with one embodiment of the present invention. In operation 300, a document, i.e. contract, may be received including a plurality of terms. Once received, at least one of the terms of such document may be identified in operation 302. As such, the identified term of the document may be obfuscated. See operation 304. This feature may be particularly beneficial when giving a party the document when one wants to retain some of the terms thereof as confidential.

In one embodiment of the instant aspect, the contract may be received from a first party, and further sent to a second party with the at least one obfuscated term utilizing a network. As an option, the at least one term of the contract may be identified based on a list of terms.

Contract Certifier: The contract certifier is a corporate structure or a legal entity in charge of certifying newly-created contracts. The term "contract authorizer" may also be used. Typically, this certification is achieved using a digital signature, but may be accomplished using any number of methods. If a contract C or obfuscated contract obs(C) has been digitally signed by the contract certifier, it may be denoted by [C] or [obs(C)], respectively.

Ensuring Privacy

Figure 4:
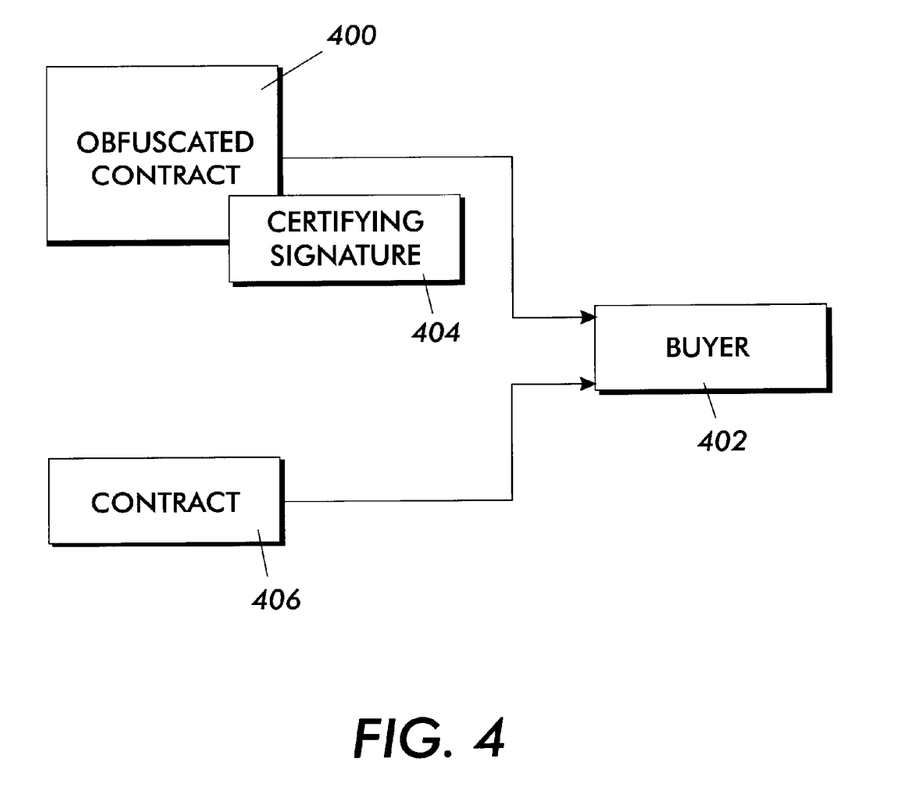
FIG. 4 is a diagram illustrating various parties involved in the implementation of one embodiment of the present invention to ensure both distribution chain integrity and privacy.

FIG. 4 is a diagram illustrating various parties involved in the implementation of one embodiment of the present invention to ensure both distribution chain integrity and privacy. As shown, an old obfuscated contract 400 is sent from a seller to a buyer 402 along with a certifying signature 404. A new contract 406 is also provided to the buyer 402.

It is assumed that buyers (or their software) may accept only contracts which have been approved by the contract certifier. To maintain privacy, the contract certifier may see only obfuscated contracts, so only obfuscated contracts can be directly signed by the authority. Therefore, approval of a contract C is ascertained by providing the buyer or user with an obfuscated contract [obs(C)] that has been digitally signed by the certification authority, along with the same contract C with terms "in the clear." The software of the present invention checks that the contract C matches the obfuscated contract obs(C) (using the verification property of commitment schemes described above) and checks the digital signature on the obfuscated contract [obs(C)]. If these tests succeed, then based on the binding property of the commitment scheme, the user knows that the presented contract C uniquely matches the certified version [obs(C)].

If presented with a digital work by its author along with an obfuscated version obs(C) of the proposed contract C, the contract certifier checks that the obfuscated contract is well-formed (i.e., is syntactically valid in the rights language) and that the values supplied for each entry is within any system-wide bounds for the fields of the appropriate type that might be in place. Checking the latter condition may require zero-knowledge proofs for the boundedness of certain fields. If these conditions hold, the contract certifier digitally signs the obfuscated contract and returns [obs(C)] to the author.

Figure 5:
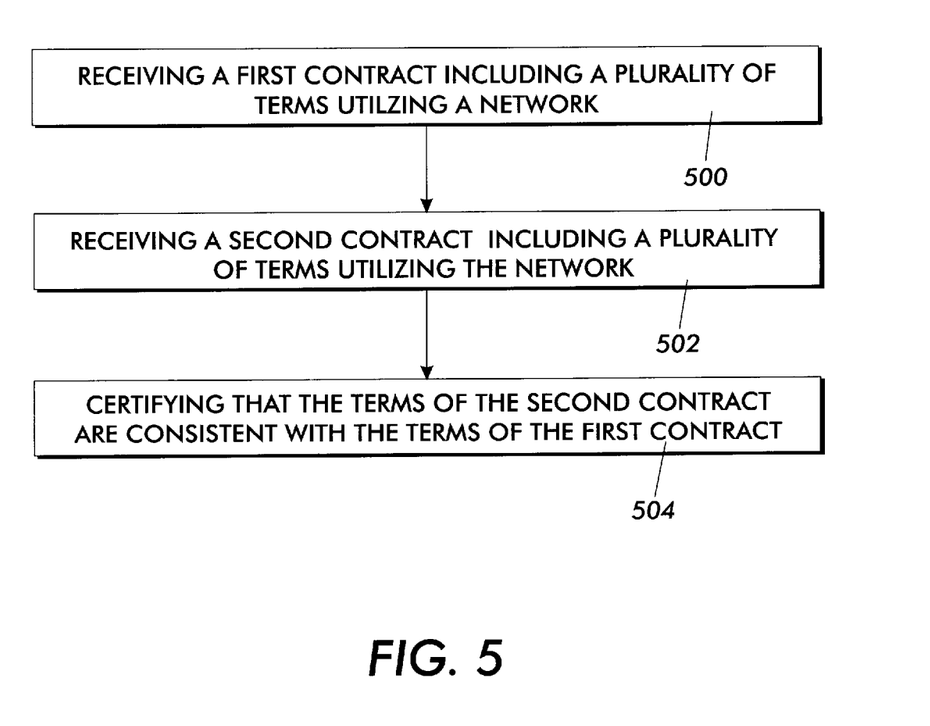
FIG. 5 is a flowchart illustrating a method for certifying contracts utilizing a network in accordance with one embodiment of the present invention.

FIG. 5 is a flowchart illustrating a method for certifying contracts utilizing a network. Initially, in operations 500 and 502, a first and second contract is received utilizing a network. Each contract includes a plurality of terms. It is then certified that the terms of the second contract are consistent with the terms of the first contract. Note operation 504.

In one embodiment of the present invention, received with the contacts is proof that the terms of the second contract are consistent with, or "faithful" to the terms of the first contract. As such, the certification may be based on the proof. As an option, the proof may be generated by comparing the terms of the first and second contract.

The first contract may involve an agreement between a first party and a second party. Further, the second contract may involve a subsequent agreement between the second party and a third party. Still yet, a certifier may be generated if it is certified that the terms of the second contract are consistent with the terms of the first contract. Thereafter, the second contract and the certifier may be sent to the third party.

The first contract may be received with a certifier indicating that the terms of the first contract are consistent with terms of a previous contract. Optionally, at least a portion of the terms of at least one of the contracts is obfuscated, and the second contract may be sent with obfuscated terms utilizing the network.

Figure 6:
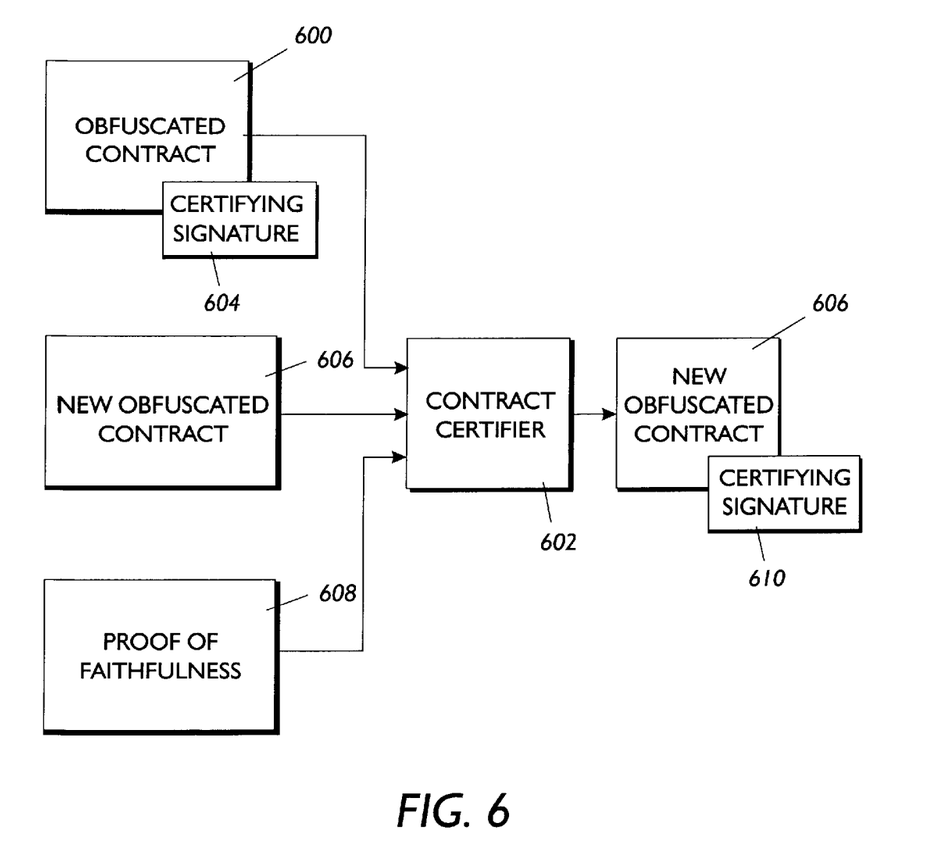
FIG. 6 is a diagram illustrating various parties involved in the implementation of the method set forth in FIG. 5.

FIG. 6 is a diagram illustrating various parties involved in the implementation of the method set forth in FIG. 5. As shown, an old obfuscated contract 600 is sent from a seller to a contract certifier 602 along with a certifying signature 604. Also sent to the contract certifier 602 is a new obfuscated contract 606 and a proof of faithfulness 608. After implementing the method of FIG. 5, the new obfuscated contract 606 is sent to a buyer along with a certifying signature 610 that certifies that the terms of the old obfuscated contract 600 are consistent with the new obfuscated contract 606.

A reseller, like any other buyer in this system, obtains a digital work with a digitally signed, obfuscated contract [obs(C)] 600 and the corresponding (unsigned) contract C in the clear. To obtain certification for a new contract D on a digital work, it may convince the contract certifier 602 of the faithfulness of the new contract. To do this, the reseller creates obs(D) 606 and a zero-knowledge proof of faithfulness Z 608 establishing that D is faithful to C. It sends the contracts [obs(C)] 600 and obs(D) 606 and the zero-knowledge proof of faithfulness Z 608 to the contract certifier 602. If indeed D is faithful to C, then the proof Z 608 may verify correctly and the contract certifier 602 may return the digitally signed [obs(D)] 606 to the reseller to give to buyers or other entities in the chain of distribution.

It should be noted that once the proof of faithfulness 608 has been created and used to convince the contract certifier 602 of the faithfulness of the new contract, it is no longer needed. Only the new contract D and the new certified obfuscated contract [obs(D)] 606 are needed for the next step in the chain of distribution. This is an important optional optimization step in the present scheme.

Creating a Proof of Faithfulness

The manner in which the proof of faithfulness is constructed will now be set forth. The obfuscated contracts obs(C) and obs(D) consist of sequences of tokens in the rights language, some of which represent commitments to secret values. Because the reseller has access to C and D, it knows how to open each of these commitments. The aim is to prove that the values contained in matching commitments are in the proper relationships.

For example, the reseller might wish to provide a proof the predicate of $P(\alpha, \beta) \equiv \alpha\beta$ to show that the commitment in D containing the fee $\beta$ opens to a value no less than the corresponding commitment in C containing $\alpha$. In general, all predicates that may be shown are compositions of elementary predicates for equality ($\alpha=\beta$), addition ($\alpha+\beta=\gamma$), multiplication ($\alpha\beta=\gamma$), inequality ($\alpha \leq \beta$), and bit-value ($\alpha\epsilon\{0, 1\}$), or compositions and Boolean combinations of these predicates.

Fortunately, it is easy to efficiently generate short proofs of these predicates using the commitment scheme of Cramer-Damgard. For more information on how to implement equality, addition, multiplication, and bit-value proofs of constant size, reference may be made to R. Cramer and I. Daxngård, "Zero-Knowledge Proofs for Finite Field Arithmetic, or: Can Zero-Knowledge be for Free?", Proc. of CRYPTO '98, Lecture Notes in Computer Science, vol. 1462, pp. 424–441, Springer-Verlag (1998) which is incorporated herein by reference in its entirety.

Choice of Commitment Scheme

The present invention employs generic zero-knowledge techniques which can indeed be quite efficient and practical when applied to the problem of distribution chain security. Optionally, the present invention may employ any of the commitment schemes set forth in the Cramer and I. Daxngard document set forth hereinabove.

In one embodiment, a scheme may be used that is based on the difficulty of the discrete logarithm problem in subgroups. In this scheme, the contract certifier chooses primes p, q such that q is a divisor of p–1, with p much larger than q. (It is typical to have p be 1024 bits in length and q be 160 bits in length.) Values g, h$\epsilon Z_p$ are chosen such that g and h=g$^x$ generate the same subgroup of $Z_p$, order q. The contract certifier keeps the value x secret and announces the values p, q, g and h publicly. These may be needed by the author and resellers to generate obfuscated contracts.

To generate a commitment to the value a, one computes $c=g^a h^r$ mod p for a randomly-chosen value r. Using the above parameters this commitment may be 1024 bits in length. Commitments in this scheme enjoy unconditional hiding—even with unlimited computational power it is impossible for any party to determine the value a from c. Therefore, distribution chain privacy is complete. However, these commitments are conditionally binding—it is guaranteed that a party can open the commitment c to reveal only the value a only if the party has not obtained the value x. The buyer, then, may trust that the contract certifier's secret x has not been compromised by the seller to ensure distribution chain integrity.

The second commitment scheme is based on the difficulty of the Decision Diffie-Hellman problem in subgroups. In this scenario, the author generates the parameters p, q, g, h as above. A commitment to a value $\alpha\epsilon Z_q$ is expressed as the pair $$c=(g^{\alpha+r}, h^r)$$

for a randomly-chosen r$\epsilon Z_q$. Commitments in this scheme, using the above parameters, may be 2048 bits in length.

Unlike the first scheme, these commitments enjoy unconditional binding, which guarantees that a commitment can be opened to one value only. This ensures complete distribution chain integrity. However, this scheme is conditionally hiding—if the contract certifier obtains the author's secret x (which may be revealed to resellers as well, although there is no advantage in doing so) then distribution chain privacy cannot be ensured.

Because the two schemes differ in the hiding and binding properties, the proper choice of commitment scheme depends on the security model being used. However, in most cases the first scheme is sufficient, and is preferred due to its —use of smaller commitments and more efficient proof generation and verification steps. To prevent against compromise of the contract verifier's secret m, this value can erased immediately after $h=g^x$ computed, as x is not needed for any protocols.

It should be noted that these commitment schemes use as additional input a random value r. To include this in the scheme, it is suggested for compactness that the random value r be determined by the output of a pseudorandom number generator or pseudorandom function. A seed R to this generator may be included in the unobfuscated contract; to generate the ith commitment $c_i$, the reseller can compute the ith output $r_i$ from the PRNG seeded with r and compute $C_i$=commit($v_i$, $r_i$). A buyer can confirm that the ith commitment matches a value in the clear by extracting R from the unobfuscated contract, computing $r_i$, and checking $c_i$=commit($v_i$, $r_i$).

Choice of Zero-Knowledge Proofs

In one embodiment, the efficient zero-knowledge proof schemes of Cramer-DamgÅrd may be used. For both of the commitments schemes described above, they give efficient proofs for equality, arbitrary sums, pairwise products, and equality to zero or one. Actual proof sizes and running times for generation and verification will be set forth hereinafter in greater detail. Intuitively, much of the efficiency derives from the "homomorphic" properties of the underlying commitment schemes. For example, the product of two commitments is a commitment of the sum of the committed values. These schemes also use the standard Fiat-Shamir heuristic to make the proofs non-interactive. For more information regarding the Fiat-Shamir heuristic, reference may be had to A. Fiat and A. Shamir, "How to prove yourself—Practical solutions to identification and signature problems", Proc, of Crypto '86, Lecture Notes in Computer Science, vol. 263, pp. 186–194, Springer-Verlag (1986) which is incorporated herein by reference in its entirety.

To create proofs for predicates involving, a new technique has been developed to improve on the efficiency of published schemes. For simplicity, the present description assumes use of the discrete-log-based commitment scheme described above, although the approach works for the other commitment scheme as well.

Suppose that it may be proved that $\alpha \leq \beta$ for values $\alpha$, $\beta \in (0,2')$ and $2' < q/2$. If $\gamma = \beta - \alpha$, then it is known that $\gamma \in (0,2')$ if and only if $\alpha \leq \beta$. Thus the aim is to create an efficient zero-knowledge proof of this bound on $\gamma$. In fact, the proof may be the size of about log $\beta$ commitments.

The present invention works with commitments $\alpha$=commit($\alpha$, r)=$g^\alpha h^r$ and b=commit($\beta$, s)=$g^\beta h^s$ for some random r, s $\in Z_q$. The prover can compute the commitment c=commit($\gamma$, r−s), and the verifier can compute this as c=a/b.

Let $(\gamma_i)$ (t−1, i=0) be the binary representation of $\beta - \alpha = \Sigma$ (t−1, i=0) $2^i \gamma_i$. Choose random values $r_1, \ldots, r_{t-1}$ and set $r_0 = r - s - \Sigma(t-1, i=0) 2^i r_i$. Then let $C_i$=commit($y_i$, $r_i$)=$g^{\gamma_i} h^{r_i}$ for all i=0, t−1.

If the verifier knows that the bound $\alpha$, $\beta \in (0, 2^r)$ holds, then it is sufficient to provide the commitments $c_0, \ldots, c_{t-1}$ along with a proof that each $c_i$ is a bit. The verifier checks each $c_i$ bit proof and confirms that indeed $b \Pi c_i = \alpha$.

If the verifier does not know that $\alpha$ and $\beta$ is bounded, then a zero-knowledge proof that $\alpha \Sigma(0, 2t)$ and $\beta \in (0, 2^r)$ can be constructed in a similar way and may accompany the above proofs. However, it is usually the case that one of the values comes from an obfuscated contract that has already been certified, and therefore the certifier trusts that it is bounded. In that case, proof size may be optimized by leaving out the unnecessary proof.

More complicated arithmetic predicates can be expressed through the use of commitments to temporary values. For example, to provide a proof of P $\alpha\beta + \gamma\delta$, temporary commitments may be made to values $\epsilon$, $\zeta$ and it may be shown that a $\beta = \epsilon$, $\epsilon + \gamma = \zeta$, and $\zeta < \delta$. The proof of the predicate P then consists of the temporary commitments followed by proofs for each of the elementary arithmetic predicates. This composition is clearly zero-knowledge. Furthermore, predicates that are Boolean combinations of these predicates can be represented with little extra overhead using standard techniques.

Implementation and Timing Details

Using the discrete-log-based commitment scheme outlined above, the proof method outlined above produces fairly small proofs. For example, suppose contracts C and D each contain a sensitive field such as a time or a price. A typical size for a commitment is 1024 bits, or 128 bytes. This yields obfuscated contracts obs(C) and obs(D) with corresponding fields of size 128 bytes.

To prove that obfuscated commitments are in the correct relationship to yield a faithful contract, one or some, combination of the following primitive proofs may be used. One might need a proof that the values that two commitments encode are equal; using the parameters expressed above, this may require 148 bytes. A proof that the value encoded in a commitment is a bit uses 316 bytes. A proof that the value in a commitment is the product of two the values encoded in two other commitments may require 484 bytes. To generate a proof that a committed t-bit value is less than another committed t-bit value requires t additional commitments and t bit proofs; for the typical value of t=20 (the size of a field storing a date or a price), this would yield a proof size of about 9 kilobytes. An additional 9 kilobytes is needed for each operand to prove that it is a 1-bit value; however, usually only one such extra proof is required per inequality.

Suppose a contract has 15 sensitive fields. The obfuscated version of the contract may typically be 2–3K larger than the unobfuscated version. If five of these fields require equality proofs, five require multiplication proofs, and five represent 20-bit quantities requiring less-than proofs, the total "proof of faithfulness" may be approximately 85K. (About 80K of this is needed to store the less-than proofs, which clearly dominate the space requirements in this system.)

One embodiment of the present invention may be implemented in Java on a 450 MHz Intel Pentium III running Linux. Experimental results of such implementation are shown in Table 1.

TABLE 1

| proof type | size | create time | verify time |
| --- | --- | --- | --- |
| commitment | 128 bytes | 25–50 ms | 25–50 ms |
| $\alpha = \beta$ | 148 bytes | 25 ms | 50 ms |
| $\alpha + \beta = \gamma$ | 148 bytes | 25 ms | 50 ms |

TABLE 1-continued

| proof type | size | create time | verify time |
| --- | --- | --- | --- |
| $\alpha \epsilon \{0, 1\}$ | 316 bytes | 80 ms | 100 ms |
| $\alpha\beta = \gamma$ | 484 bytes | 130 ms | 200 ms |
| $\alpha \leq \beta$ | 9 kilobytes | 1.8 s | 1.8 s |

Blackdown implementation of the Java 1.2 JDK. With p of size 1024 bits and q of size 160 in the discrete-log-based scheme, creating commitments of arbitrary 160-bit values takes approximately 50 milliseconds. Creating commitments to small values, which is typical in these contracts, takes approximately 25 milliseconds. Creating equality proofs takes approximately 25 milliseconds, while verifying equality proofs takes about 50 milliseconds. Additions do not need proofs since in the scheme a commitment to the sum of k committed values can be computed as the product of the k commitments. (So to prove $\alpha+\beta=\gamma$, only one equality proof is needed.) Proving that a is either 0 or 1 requires 80 milliseconds, while verifying this proof takes about 100 milliseconds. Creating multiplication proofs requires about 130 milliseconds, while verifying multiplication proofs requires approximately 200 milliseconds. Creating and verifying "less than or equal to" proofs for 20-bit quantities each require about 1.8 seconds. These running times are dominated by the time needed to perform modular exponentiation of a 1024-bit base to a 160-bit exponent, which, using the Java large integer package, takes approximately 20–22 milliseconds.

Alternate Embodiments

One important area that deserves further study is how choices of fee payment schemes affect the resulting faithfulness predicates and zero-knowledge proofs. For instance, instead of listing a single fee and account number in the digital contract, one can maintain a list of fee-payee pairs. Then instead of routing funds from a user to a clearinghouse in a single transaction, the user is charged the sum of the fees and the software routes the shares of that sum individually to the clearinghouse on behalf of each payee (or the shares are sent to the payees directly.) While this allows the privacy of the reseller's profit margin to be maintained with respect to the contract certifier, this information is now unfortunately revealed to the buyer. In some cases this may be unacceptable.

Another scenario is one in which the total fee is listed in the digital contract and the last seller in the chain of distribution is listed as the recipient of those funds. In addition, however, a list of electronic addresses of other payees is maintained, with no information about the size of their shares given. When the right in question is exercised, the user's funds are routed to the last reseller and a notice is given to the remaining parties; these can either generate requests from these parties to the reseller to obtain their shares of the funds, or be logged for accounting purposes or later retrieval. In this scenario, although the number and identities of middlemen in the chain of distribution is revealed, the privacy of the profit margin is maintained from not only the contract certifier but the financial clearinghouse as well.

A more complicated but perhaps more complete solution would be to keep in the contract a list of account numbers and amounts encrypted in a clearinghouse's public key; although this would require additional overhead as zero-knowledge proofs involving encrypted values would need to be generated. These might be much larger if the encryption scheme is incompatible with the arithmetic relations for which efficient proofs are already available.

It may be desirable to allow resellers to lose money on individual transactions, e.g., by repackaging attractive offers as "loss-leaders." Some fee payment schemes can support this in the present approach, when combined with appropriate efficient zero-knowledge proofs of range-boundedness, sums, and less-than predicates.

The use of a contract certifier is just one example of a scenario which can take advantage of zero-knowledge proofs of faithfulness. Other scenarios are possible; in a scenario with no contract certifier, a reseller would append changes to work's original obfuscated contract along with a proof of faithfulness of these changes. The concatenation of obfuscated contracts, corresponding proofs of faithfulness, and (only) the final plaintext contract would be revealed to the buyer.

Although this scheme has the advantage that it does not need a third party to certify contracts, it suffers from very large contract sizes, since the contract grows substantially each time changes are made. The advantage of contract certification is that it allows one to "throw away" the proof of faithfulness; that optimization is not possible in this scenario. Furthermore, contract verification is time consuming, as the entire composition of changes needs to be verified. It is precisely these compositions that are optimized by the contract authorizer. Lastly, for this scheme to work it is necessary to use a commitment scheme with unconditional binding.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for certifying contracts utilizing a network, comprising:
    (a) receiving a first contract including a plurality of terms utilizing the network;
    (b) receiving a second contract including a plurality of terms utilizing the network; and
    (c) certifying that the terms of the second contract are consistent with the terms of the first contract wherein at least a portion of the terms of at least one of the contracts are obfuscated.

2. The method as recited in claim 1, and further comprising receiving proof that the terms of the second contract are consistent with the terms of the first contract utilizing the network, wherein the certification is based on the proof.

3. The method as recited in claim 2, wherein the proof is generated by comparing the terms of the first and second contract.

4. The method as recited in claim 1, wherein the first contract involves an agreement between a first party and a second party, and the second contract involves a subsequent agreement between the second party and a third party.

5. The method as recited in claim 4, and further comprising generating a certifier if it is certified that the terms of the second contract are consistent with the terms of the first contract.

6. The method as recited in claim 5, and further comprising sending the second contract and the certifier to the third party.

7. The method as recited in claim 1, wherein the first contract is received with a certifier indicating that the terms of the first contract are consistent with terms of a previous contract.

8. The method as recited in claim 1, and further comprising sending the second contract with obfuscated terms utilizing the network.

9. A computer program embodied on a computer readable medium for certifying contracts utilizing a network, comprising:

(a) a code segment for receiving a first contract including a plurality of terms utilizing the network;

(b) a code segment for receiving a second contract including a plurality of terms utilizing the network; and (c) a code segment for certifying that the terms of the second contract are consistent with the terms of the first contract wherein at least a portion of the terms of at least one of the contracts are obfuscated.

10. The computer program as recited in claim 9, and further comprising a code segment for receiving proof that the terms of the second contract are consistent with the terms of the first contract utilizing the network, wherein the certification is based on the proof.

11. The computer program as recited in claim 10, wherein the proof is generated by comparing the terms of the first and second contract.

12. The computer program as recited in claim 9, wherein the first contract involves an agreement between a first party and a second party, and the second contract involves a subsequent agreement between the second party and a third party.

13. The computer program as recited in claim 12, and further comprising a code segment for generating a certifier if it is certified that the terms of the second contract are consistent with the terms of the first contract.

14. The computer program as recited in claim 13, further comprising a code segment for sending the second contract and the certifier to the third party.

15. The computer program as recited in claim 9, wherein the first contract is received with a certifier indicating that the terms of the first contract are consistent with terms of a previous contract.

16. The computer program as recited in claim 9, and further comprising a code segment for sending the second contract with obfuscated terms utilizing the network.

17. A system for certifying contracts utilizing a network, comprising:

(a) logic for receiving a first contract including a plurality of terms utilizing a network;

(b) logic for receiving a second contract including a plurality of terms utilizing the network; and (c) logic for certifying that the terms of the second contract is consistent with the terms of the first contract wherein at least a portion of the terms of at least one of the contracts are obfuscated.

18. A computer-controlled method for obfuscating terms of a document, comprising:

(a) receiving the document including a plurality of terms;

(b) identifying at least one of the terms of the document;

(c) obfuscating the at least one identified term of the document; and (d) providing the document with the at least one obfuscated term.

19. The method as recited in claim 18, wherein the document is a contract.

20. The method as recited in claim 19, wherein the contract is received from a first party, and wherein the step of providing further comprises sending the contract with the at least one obfuscated term to a second party.

21. The method as recited in claim 20, wherein the contract is received and sent utilizing a network.

22. The method as recited in claim 18, wherein the at least one term of the document is identified based on a list of terms.

23. A computer program embodied on a computer readable medium for obfuscating terms of a document, comprising:

(a) a code segment for receiving the document including a plurality of terms;

(b) a code segment for identifying at least one of the terms of the document; and (c) a code segment for obfuscating the at least one identified term of the document.

24. The computer program as recited in claim 23, wherein the document is a contract.

25. The computer program as recited in claim 24, wherein the contract is received from a first party, and further comprising a code segment for sending the contract with the at least one obfuscated term to a second party.

26. The computer program as recited in claim 25, wherein the contract is received and sent utilizing a network.

27. The computer program as recited in claim 23, wherein the at least one term of the documents is identified based on a list of terms.

28. A system for obfuscating terms of a document, comprising:

(a) logic for receiving the document including a plurality of terms;

(b) logic for identifying at least one of the terms of the document; and (c) logic for obfuscating the at least one identified term of the document.

* * * * *